United States Patent
Lee et al.

(10) Patent No.: US 11,187,942 B2
(45) Date of Patent: Nov. 30, 2021

(54) COLOR CONVERSION PANEL AND DISPLAY DEVICE INCLUDING THE SAME

(71) Applicant: SAMSUNG DISPLAY CO., LTD., Yongin-si (KR)

(72) Inventors: Kwang Keun Lee, Osan-si (KR); Young Min Kim, Anyang-si (KR); Hae Il Park, Seoul (KR); Seon-Tae Yoon, Seoul (KR); Baek Hee Lee, Yongin-si (KR); Kun Hee Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/894,642

(22) Filed: Jun. 5, 2020

(65) Prior Publication Data
US 2020/0301208 A1    Sep. 24, 2020

Related U.S. Application Data

(62) Division of application No. 15/259,378, filed on Sep. 8, 2016, now Pat. No. 10,712,614.

(30) Foreign Application Priority Data

Sep. 30, 2015  (KR) .......................... 10-2015-0137741
Aug. 29, 2016  (KR) .......................... 10-2016-0110048

(51) Int. Cl.
*G02F 1/13357* (2006.01)
*B82Y 30/00* (2011.01)
(Continued)

(52) U.S. Cl.
CPC ........ *G02F 1/133617* (2013.01); *B82Y 20/00* (2013.01); *B82Y 30/00* (2013.01);
(Continued)

(58) Field of Classification Search
CPC ............... G02B 5/223; G02F 1/133504; G02F 2202/04; H01L 33/50
See application file for complete search history.

(56) References Cited

U.S. PATENT DOCUMENTS 7,750,984 B2   7/2010   Ha et al.
8,277,064 B2   10/2012  Willemsen et al.
(Continued)

FOREIGN PATENT DOCUMENTS

CN     101038391 A     9/2007
CN     101075663 A     11/2007
(Continued)

OTHER PUBLICATIONS

Chinese Intellectual Property Office Action for corresponding Chinese Patent Application No. 201610866012.1, dated Jul. 14, 2020 9 pages.
(Continued)

*Primary Examiner* — Michael H Caley
*Assistant Examiner* — Jonathan Y Jung
(74) *Attorney, Agent, or Firm* — Lewis Roca Rothgerber Christie LLP

(57) ABSTRACT

A color conversion panel includes a substrate and a red color conversion layer, a green color conversion layer, and a transmission layer which are disposed on the substrate. The transmission layer includes at least one of a pigment and a dye.

7 Claims, 12 Drawing Sheets

(51) Int. Cl.
*G02B 5/20* (2006.01)
*B82Y 20/00* (2011.01)
*G02F 1/1335* (2006.01)
*G02B 5/22* (2006.01)
*G02F 1/1368* (2006.01)
*G02F 1/1333* (2006.01)

(52) U.S. Cl.
CPC .......... *G02B 5/201* (2013.01); *G02F 1/1368* (2013.01); *G02F 1/133504* (2013.01); *G02F 1/133512* (2013.01); *G02F 1/133514* (2013.01); *G02F 1/133528* (2013.01); *G02B 5/223* (2013.01); *G02F 1/133377* (2013.01); *G02F 2201/08* (2013.01); *G02F 2202/04* (2013.01); *G02F 2202/36* (2013.01)

(56) References Cited

U.S. PATENT DOCUMENTS

| | | | |
|---|---|---|---|
| 9,557,610 | B2 | 1/2017 | Kim et al. |
| 9,897,855 | B2 | 2/2018 | Yang et al. |
| 2003/0127656 | A1 | 7/2003 | Aizawa et al. |
| 2008/0042154 | A1 | 2/2008 | Wano |
| 2013/0154478 | A1* | 6/2013 | Ohe ............... H05B 33/10 315/85 |
| 2013/0242228 | A1 | 9/2013 | Park et al. |
| 2014/0160408 | A1* | 6/2014 | Cho ............... G02F 1/133617 349/110 |
| 2014/0192294 | A1* | 7/2014 | Chen ............... G02F 1/133514 349/69 |
| 2015/0077966 | A1 | 3/2015 | Bessho et al. |
| 2015/0176775 | A1* | 6/2015 | Gu ............... G02F 1/133617 349/42 |

FOREIGN PATENT DOCUMENTS

| | | |
|---|---|---|
| CN | 104330918 A | 2/2015 |
| CN | 104849902 A | 8/2015 |
| JP | 2005-209662 A | 8/2005 |
| JP | 2013-235141 A | 11/2013 |
| KR | 10-2010-0041122 A | 4/2010 |
| KR | 10-1243819 B1 | 3/2013 |

OTHER PUBLICATIONS

Heo et al., "Color PH-LCD Using STN Mode", Proc. 5th Int. Display Workshops 1998, 1998, pp. 221-224.

Njo et al., "Light-Efficient Liquid Crystal Displays Using Photoluminescent Color Filters", Society Information Display Processings 2000, p. 343-345.

Oh et al., "Highly efficient full-color display based on blue LED backlight and electrochromic light-valve coupled with front-emitting phosphors", Optics Express, Aug. 15, 2011, vol. 19, No. 17, p. 16022-16031.

* cited by examiner

COLOR CONVERSION PANEL AND DISPLAY DEVICE INCLUDING THE SAME

CROSS-REFERENCE TO RELATED APPLICATIONS

This application is a divisional of U.S. patent application Ser. No. 15/259,378, filed Sep. 8, 2016, which claims priority to and the benefit of Korean Patent Application No. 10-2015-0137741, filed Sep. 30, 2015 and Korean Patent Application No. 10-2016-0110048, filed Aug. 29, 2016, the entire content of all of which is incorporated herein by reference.

BACKGROUND

(a) Field

The present disclosure relates to a color conversion panel and a display device including the same.

(b) Discussion of the Related Technology

Among display devices, currently the most widely used is a liquid crystal display, which has a structure in which field generating electrodes are provided in each of two display panels. Typically, a plurality of thin film transistors and pixel electrodes are arranged in a matrix form in one panel (hereinafter referred to as a 'thin film transistor array panel'), color filters of red, green, and blue are disposed in the other panel (hereinafter referred to as a 'common electrode panel'), and a common electrode covers the entire surface thereof. However, in liquid crystal displays, light loss occurs in a polarizer and a color filter.

The above information disclosed in this Background section is only to enhance the understanding of the background of the invention and therefore it may contain information that does not form the prior art that is already known in this country to a person of ordinary skill in the art.

SUMMARY

One aspect of the present invention provides a color conversion panel that improves contrast ratio and color reproducibility, and a display device including the same.

Another aspect of the invention provides a color conversion panel device, which may comprise: a substrate; and a red color conversion layer, a green color conversion layer, and a transmission layer which are disposed over the substrate, wherein the transmission layer comprises at least one of a pigment and a dye.

In the foregoing device, at least one among the red color conversion layer, the green color conversion layer, and the transmission layer may comprise scattering members. The content of the scattering members included in the transmission layer may be different from that of each or one of the red color conversion layer and the green color conversion layer. The red color conversion layer and the green color conversion layer comprise at least one of a phosphor and a quantum dot. The transmission layer does not comprise the phosphor and the quantum dot. The red color conversion layer and the green color conversion layer do not comprise the pigment and the dye.

Still in the foregoing device, the pigment may be a blue pigment, and the dye may be a blue dye. The color conversion panel device may further comprise a blue blocking filter disposed between at least one of the red color conversion layer and the green color conversion layer and the substrate. The color conversion panel device may further comprise an assistance transmission layer disposed between at least one of the red color conversion layer and the green color conversion layer and the substrate. The color conversion panel device may further comprise a light blocking member comprising light blocking portions, each of which is disposed between immediately neighboring two among the red color conversion layer, the green color conversion layer, and the transmission layer.

Still another aspect of the invention provides a display device, which may comprise: a display panel; and a color conversion panel disposed over the display panel, wherein the color conversion panel comprises a substrate overlapping the display panel, and a red color conversion layer, a green color conversion layer, a transmission layer which are disposed between the substrate and the display panel, and the transmission layer comprising at least one of a pigment and a dye.

In the foregoing display device, the red color conversion layer and the green color conversion layer do not comprise the pigment and the dye. At least one among the red color conversion layer, the green color conversion layer, and the transmission layer may comprise scattering members. The content of the scattering members included in the transmission layer may be different from that of each or one of the red color conversion layer and the green color conversion layer. The red color conversion layer and the green color conversion layer may comprise at least one of a phosphor and a quantum dot. The transmission layer does not comprise the phosphor and the quantum dot. The pigment may be a blue pigment, and the dye may be a blue dye.

Still in the foregoing display device, the display device may further comprise a blue blocking filter disposed between at least one of the red color conversion layer and the green color conversion layer and the substrate. The display device may further comprise an assistance transmission layer disposed between at least one of the red color conversion layer and the green color conversion layer and the substrate. The display device may further comprise a light blocking member which comprises light blocking portions, each of which disposed between immediately neighboring two among the red color conversion layer, the green color conversion layer, and the transmission layer. The display device may further comprise a backlight assembly configured to emit light toward the display panel and the color conversion panel.

Further in the foregoing display device, the display panel may further comprise: a liquid crystal panel, and a polarizer disposed over both surfaces of the liquid crystal panel. The liquid crystal panel may comprise: a thin film transistor disposed over a first substrate, a pixel electrode connected to the thin film transistor, a common electrode opposing the pixel electrode, wherein the pixel electrode and the common electrode are configured to form an electric field, a second substrate overlapping and spaced from the first substrate, and a liquid crystal layer disposed between the first substrate and the second substrate. The liquid crystal panel may comprise: a base substrate; a thin film transistor disposed over the base substrate, a pixel electrode connected to the thin film transistor, a roof layer overlapping the pixel electrode, and a liquid crystal layer disposed in a plurality of microcavities disposed between the pixel electrode and the roof layer.

A further aspect of the invention provides a display device, which may comprise: a thin film transistor array panel; a color conversion display panel overlapping the thin film transistor array panel; and a liquid crystal layer disposed between the thin film transistor array panel and the color conversion display panel and comprising liquid crystal molecules, wherein the color conversion display panel comprises: a substrate, and a red color conversion layer, a green color conversion layer, and a transmission layer which are disposed between the substrate and the liquid crystal layer, wherein the transmission layer comprises at least one of a pigment and a dye.

A color conversion panel according to an embodiment of the present invention includes a substrate and a red color conversion layer, a green color conversion layer, and a transmission layer disposed on the substrate, wherein the transmission layer includes at least one of a pigment and a dye.

At least one among the red color conversion layer, the green color conversion layer, and the transmission layer may include a scattering member.

The content of the scattering member included in the red color conversion layer, the green color conversion layer, and the transmission layer may be different.

The red color conversion layer and the green color conversion layer may include at least one of a phosphor and a quantum dot.

The transmission layer may not include the phosphor and quantum dot.

The red color conversion layer and the green color conversion layer may not include the pigment and dye.

The pigment may be a blue pigment, and the dye may be a blue dye.

A blue blocking filter disposed between at least one of the red color conversion layer and the green color conversion layer and the substrate may be further included.

An assistance transmission layer disposed between at least one of the red color conversion layer and the green color conversion layer and the substrate may be further included.

A light blocking member disposed between the red color conversion layer, the green color conversion layer, and the transmission layer may be further included.

A display device according to an embodiment of the present invention includes a display panel; and a color conversion panel disposed on the display panel, the color conversion panel includes a substrate, and a red color conversion layer, a green color conversion layer, and a transmission layer disposed between the substrate and the display panel, and the transmission layer includes at least one of a pigment and a dye.

The red color conversion layer and the green color conversion layer may not include the pigment and dye.

At least one among the red color conversion layer, the green color conversion layer, and the transmission layer may include a scattering member.

The content of the scattering member included in the red color conversion layer, the green color conversion layer, and the transmission layer may be different.

The red color conversion layer and the green color conversion layer may include at least one of a phosphor and a quantum dot.

The transmission layer may not include the phosphor and quantum dot.

The pigment may be a blue pigment, and the dye may be a blue dye.

A blue blocking filter disposed between at least one of the red color conversion layer and the green color conversion layer and the substrate may be further included.

An assistance transmission layer disposed between at least one of the red color conversion layer and the green color conversion layer and the substrate may be further included.

A light blocking member disposed between the red color conversion layer, the green color conversion layer, and the transmission layer may be further included.

A light assembly supplying a light to the display panel and the color conversion panel may be further included.

The display panel may further include a liquid crystal panel, and a polarizer disposed on both surfaces of the liquid crystal panel.

The liquid crystal panel may include a thin film transistor disposed on the first substrate, a pixel electrode connected to the thin film transistor, a common electrode forming an electric field with the pixel electrode, a second substrate separated from and overlapping the first substrate, and a liquid crystal layer disposed between the first substrate and the second substrate.

The liquid crystal panel may include a substrate; a thin film transistor disposed on the substrate, a pixel electrode connected to the thin film transistor, a roof layer overlapping the pixel electrode, and a liquid crystal layer disposed in a plurality of microcavities between the pixel electrode and the roof layer.

A display device according to an embodiment of the present invention includes a thin film transistor array panel; a color conversion display panel overlapping the thin film transistor array panel; and a liquid crystal layer disposed between the thin film transistor array panel and the color conversion display panel and including liquid crystal molecules, wherein the color conversion display panel includes a substrate, and a red color conversion layer, a green color conversion layer, and a transmission layer disposed between the substrate and the liquid crystal layer, and the transmission layer includes at least one of a pigment and a dye.

The color conversion panel and the display device according to an embodiment of the present invention have excellent contrast ratio and color reproducibility, thereby improving the display quality.

DETAILED DESCRIPTION OF EMBODIMENTS

Figure 1:
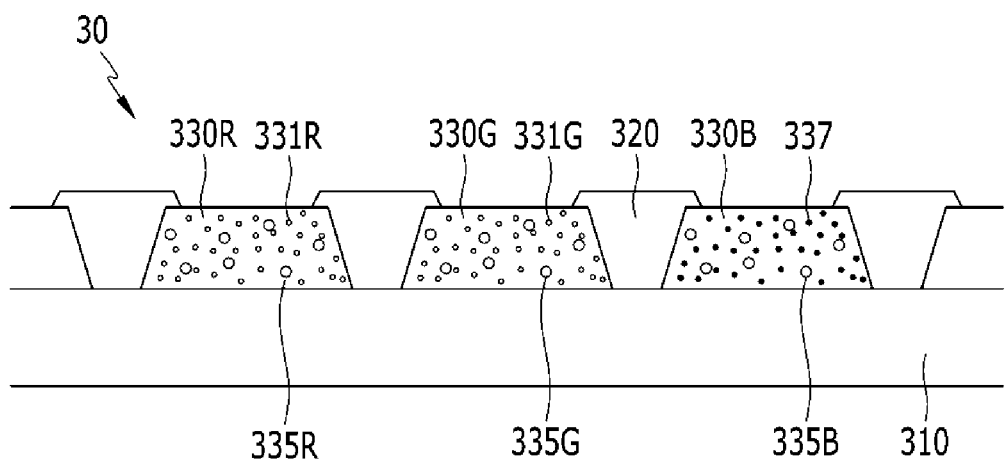
FIG. 1 is a cross-sectional view of a color conversion panel according to an embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present therebetween. In contrast, when an element is referred to as being "directly on" another element, there are no intervening elements present.

As discussed above, in liquid crystal displays, light loss occurs in a polarizer and a color filter. In order to reduce light loss and implement a high efficiency liquid crystal display, display devices may include a color conversion panel.

Now, a color conversion panel according to an embodiment of the present invention will be described with reference to FIG. 1. FIG. 1 is a cross-sectional view of a color conversion panel according to an embodiment of the present invention.

As shown in FIG. 1, a color conversion panel 30 according to an embodiment of the present invention includes a plurality of color conversion layers 330R and 330G disposed on a substrate 310, transmission layers 330B, and a light blocking member 320. The light blocking member 320 includes a plurality of portions, each of which is disposed between immediately neighboring two among the plurality of color conversion layers 330R and 330G and the transmission layers 330B. In embodiments, a plurality of color conversion layers 330R and 330G and the transmission layers 330B do not overlap each other when viewed in a viewing direction perpendicular to a major surface of the substrate 310.

The color conversion layers 330R and 330G may emit incident light into light of different colors, as an example, they may be a red color conversion layer 330R and a green color conversion layer 330G. The transmission layer 330B may emit the incident light with a separate color conversion, as an example, a blue light is incident and the blue light may be emitted.

The light blocking member 320 includes light blocking portions, each of which is disposed between immediately neighboring two among the color conversion layers 330R and 330G and the transmission layer 330B, specifically, it may define regions where the red color conversion layer 330R, the green color conversion layer 330G, and the transmission layer 330B are disposed. The light blocking member 320, and each of the adjacent color conversion layers 330R and 330G and the transmission layers 330B may partially overlap according to a manufacturing process.

The red color conversion layer 330R includes at least one of a phosphor and a quantum dot 331R converting the incident blue light into a red light, and in the present specification describes an embodiment in which the red color conversion layer 330R includes the quantum dot 331R as an example.

When the red color conversion layer 330R includes the red phosphor, the red phosphor may be one material among (Ca, Sr, Ba)S, (Ca, Sr, Ba)$_2$Si$_5$N$_8$, CaAlSiN$_3$, CaMoO$_4$, Eu$_2$Si$_5$N$_8$, though it is not limited thereto. The red color conversion layer 330R may include at least one kind of red phosphor.

The green color conversion layer 330G includes at least one of the phosphor and the quantum dot 331G converting the incident blue light into the green light, and the present specification describes an embodiment in which the green color conversion layer 330G includes the quantum dot 331G as an example.

When the green color conversion layer 330G includes the green phosphor, the green phosphor may be one material among yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, (Sr$_{1-x}$Ba$_x$)Si$_2$O$_2$N$_2$, though it is not limited thereto. The green color conversion layer 330G may include at least one kind of green phosphor. In this case, x may be any number between 0 and 1.

The red color conversion layer 330R and the green color conversion layer 330G may include quantum dots 331R and 331G converting the color instead of the phosphor, or further include quantum dots 331R and 331Ga in addition to the phosphor. In this case, the quantum dot may be selected from a Group II-VI compound, a Group III-V compound, a Group IV-VI compound, a Group IV element, a Group IV compound, and a combination thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from the group consisting of a binary compound selected from the group consisting of GaN, GaP, GaAs, GaSb, AlN, AlP, AlAs, AlSb, InN, InP, InAs, InSb, and a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of a binary compound selected from the group consisting of SnS, SnSe, SnTe, PbS, PbSe, PbTe, and a mixture thereof; a tertiary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the tertiary compound, or the quaternary compound may exist in particles at a uniform concentration, or may exist in the same particle divided into states where concentration distributions partially differ. Further, the color conversion media layer may have a core/shell structure where one quantum dot surrounds another quantum dot. An interface between the core and the shell may have a concentration gradient, such that a concentration of an element existing in the shell is gradually reduced nearing the center thereof.

The quantum dots 331R and 331G may have a full width at half maximum (FWHM) of an emission wavelength spectrum of about 45 nm or less, in an embodiment, about 40 nm or less, and in another embodiment, about 30 nm or less, and in this range, color purity or color reproducibility may be improved. Also, the light emitted through the quantum dot is irradiated in all directions, thereby improving a light viewing angle.

Further, the form of the quantum dot is a form generally used in the art and is not particularly limited, but more specifically, may be formed to be spherical, pyramidal, multi-arm-shaped, or cubic nanoparticles, nanotubes, nanowires, nanofibers, and nanoplate-shaped particles may be used.

The matrix of the transmission layer 330B may be a resin material transmitting the blue light supplied from a light assembly or a backlight device. In embodiments, the transmission layer 330B corresponding to the region emitting the blue emits the incident blue light without a separate phosphor or quantum dot.

In this case, the material of the matrix of the red color conversion layer 330R, the green color conversion layer 330G, the transmission layer 330B, and the light blocking member 320 may be a photosensitive resin, as one example, and accordingly, may be formed through the photolithography process.

Also, the red color conversion layer, the green color conversion layer, the transmission layer, and the light blocking member may be formed through a printing process, and depending on the manufacturing process, other materials that are not the photosensitive resin may be used.

In the present specification, the color conversion layer and the light blocking member are formed by the photolithography process or the printing process, but it is not limited thereto, and any method and any material may be applied.

At least one among the color conversion layers 330R and 330G and the transmission layer 330B according to an embodiment of the present invention may further include scattering members 335R, 335G, and 335B. For example, the color conversion layers 330R and 330G and the transmission layer 330B may respectively include the scattering members 335R, 335G, and 335B, but it is not limited thereto, and as an embodiment, the transmission layer 330B may include the scattering members 335B, and the red color conversion layer 330R and the green color conversion layer 330G may include the scattering members 335R and 335G. Next, an embodiment in which the color conversion layers 330R and 330G and the transmission layer 330B respectively include the scattering members 335R, 335G, and 335B will be described.

As shown in FIG. 1, the red color conversion layer 330R, the green color conversion layer 330G, and the transmission layer 330B according to an embodiment of the present invention respectively include the scattering members 335R, 335G, and 335B. The scattering members 335R, 335G, and 335B scatter the light emitted from at least one of the phosphor and the quantum dot, thereby allowing more light to be emitted. In embodiments, light emitting efficiency increases.

In this case, the content of the scattering members 335R and 335G included in the red color conversion layer 330R and the green color conversion layer 330G may be different from the content of the scattering members 335B included in the transmission layer 330B. As an example, the content of the scattering members 335B included in the transmission layer 330B may be larger than the content of the scattering members 335R and 335G included in the red color conversion layer 330R and the green color conversion layer 330G.

The scattering members 335B included in the transmission layer 330B may allow front luminance and lateral luminance of the light emitted from the transmission layer 330B to be uniform. Also, the scattering members 335R and 335G included in the red color conversion layer 330R and the green color conversion layer 330G may increase the efficiency of the light amount emitted from the red color conversion layer 330R and the green color conversion layer 330G. As described above, the scattering members 335R, 335G, and 335B included in each color conversion layer may have different effects or objects, thereby being included in different contents.

In embodiments, the scattering members 335R, 335G and 335B are scattering particles which have a substantially uniform size. The red color conversion layer 330R contains a first amount of the scattering particles, the green color conversion layer 330G contains a second amount of the scattering particles, and the transmission layer 330B contains a third amount of the scattering particles. Each of the first, second and third amounts may be measured in weight or volume with respect to the volume of each of the layers 330R, 330G and 330B. In embodiments, the first and second amounts are substantially the same as each other, but different from the third amount. In alternative embodiments, the first, second and third amounts are substantially different from each other. In one embodiment, the first and second amounts are substantially smaller than the third amount.

The material of the scattering members 335R, 335G, and 335B may be any material to evenly scatter light, and as an example, one among $TiO_2$, $ZrO_2$, $Al_2O_3$, $In_2O_3$, $ZnO$, $SnO_2$, $Sb_2O_3$, and ITO may be used.

Also, the scattering members 335R, 335G, and 335B may have a refractive index of about 1.5 or more. The color conversion layers 330R, 330G, and 330B, including the scattering members 335R, 335G, and 335B, which have this refractive index, and the transmission layer 330B may improve light emitting efficiency.

The transmission layer 330B according to an embodiment of the present invention may further include an additive, and the additive may include at least one of the pigment and the dye 337. At least one among the pigment and the dye 337 according to an embodiment of the present invention may absorb the red light and the green light incident from the outside, and may reflect the blue light. In embodiments, the transmission layer 330B contains both or one of the pigment and the dye.

As the pigment and/or the dye 337 absorb the red light and the green light and reflect the blue light, the reflectance increasing phenomenon appearing in the transmission layer 330B by the reflection of the light incident from the outside is prevented or minimized. When a significant degree of the reflection is generated in the transmission layer 330B by the reflection of the light incident from the outside, the entire contrast ratio of the display device is reduced and the color reproducibility is reduced, thereby generating display deterioration.

The pigment and/or the dye 337 may include any material to absorb the red light and the green light, and as an example according to the present invention, a blue pigment or a blue dye may be used. The blue pigment and the blue dye absorb the red light and the green light and emit or reflect the blue light.

According to an embodiment of the present invention, since the pigment and the dye 337 absorb the red light and the green light, the red color conversion layer 330R and the green color conversion layer 330G may not include the pigment and the dye 337.

The above-described color conversion panel reduces the reflection phenomenon for the light incident from the outside of the panel while providing excellent color reproducibility and light efficiency, thereby providing the improved contrast ratio.

Figure 2:
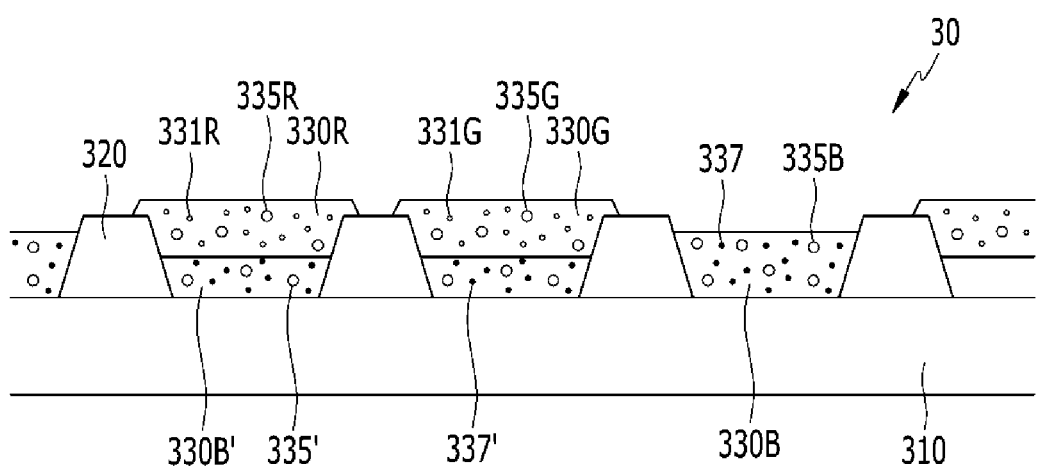
FIG. 2 and FIG. 3 are cross-sectional views of a color conversion panel according to an embodiment of the present invention.
Figure 3:
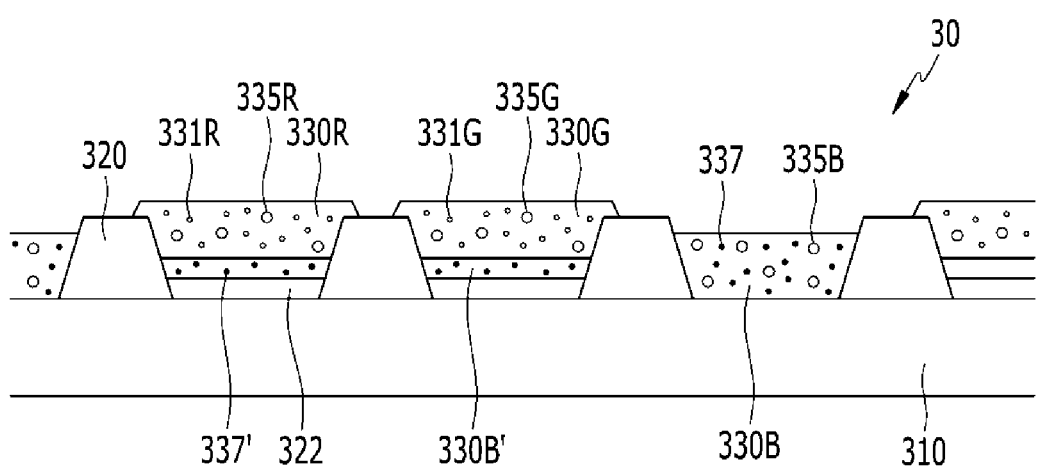

Next, the color conversion panel according to an embodiment of the present invention will be described with reference to FIG. 2 and FIG. 3. FIG. 2 and FIG. 3 are cross-sectional views of a color conversion panel according to an embodiment of the present invention. The embodiment shown in FIG. 2 and FIG. 3 is a variation embodiment of FIG. 1, such that the description of the same or similar constituent elements may be omitted.

First, referring to FIG. 2, the color conversion panel 30 according to an embodiment of the present invention may further include an assistance transmission layer 330B' disposed between the substrate 310 and each of the red color conversion layer 330R and the green color conversion layer 330G.

The assistance transmission layer 330B' may be simultaneously formed with the transmission layer 330B and may include a matrix the same material as that of the transmission layer 330B. In embodiments, the assistance transmission layer 330B' may include at least one of the pigment and dye 337' like the transmission layer 330B. The assistance transmission layer 330B' may include the scattering members 335' while the pigment or dye is present or is not present.

The scattering members 335' guide the scattering of the light emitted from the red color conversion layer 330R and the green color conversion layer 330G, and either one of the pigment and dye 337' may partially absorb the external light.

On the other hand, the assistance transmission layer 330B' may have the same shape as the red color conversion layer 330R and the green color conversion layer 330G. The red color conversion layer 330R and the green color conversion layer 330G disposed on the assistance transmission layer 330B' may be formed thicker than the transmission layer 330B.

Next, referring to FIG. 3, the color conversion panel 30 according to an embodiment of the present invention may further include a blue blocking filter 322.

The blue blocking filter 322 may be disposed between the substrate 310 and each of the red color conversion layer 330R and the green color conversion layer 330G. In an alternative embodiment, the blue blocking filter 322 may be disposed between the substrate 310 and one of the red color conversion layer 330R and the green color conversion layer 330G. In the embodiment shown in FIG. 3, the assistance transmission layer 330B' is disposed on the blue blocking filter 322, however depending on an embodiment, one of the blue blocking filter 322 and the assistance transmission layer 330B' may be omitted.

The blue blocking filter 322 blocks or absorbs the blue light supplied from the light assembly. The blue light incident to the red color conversion layer 330R and the green color conversion layer 330G from the light assembly is converted into red or green by the phosphor or the quantum dot, in which case the partial blue light may be emitted to the color conversion layer. Accordingly, the blue blocking filter 322 prevents or inhibits the emitted red or green and the blue by the light assembly from being mixed.

Figure 4:
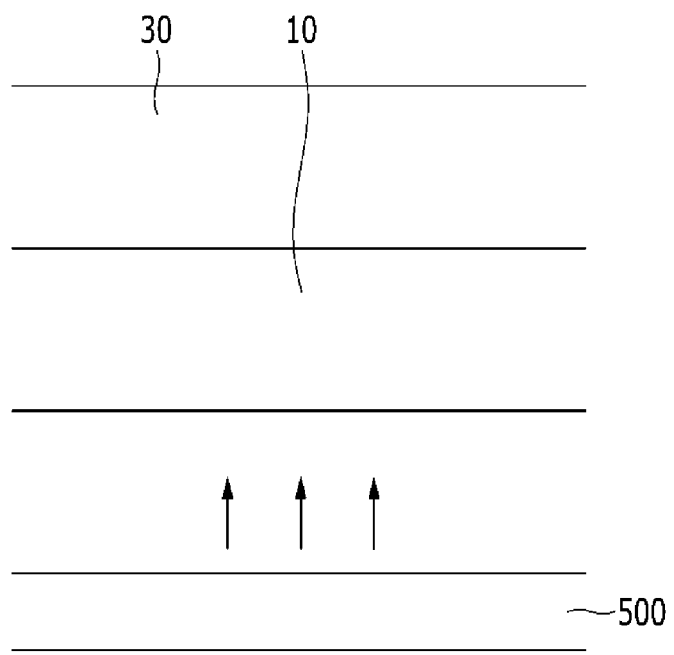
FIG. 4 is a schematic cross-sectional view of a display device according to an embodiment of the present invention.
Figure 5:
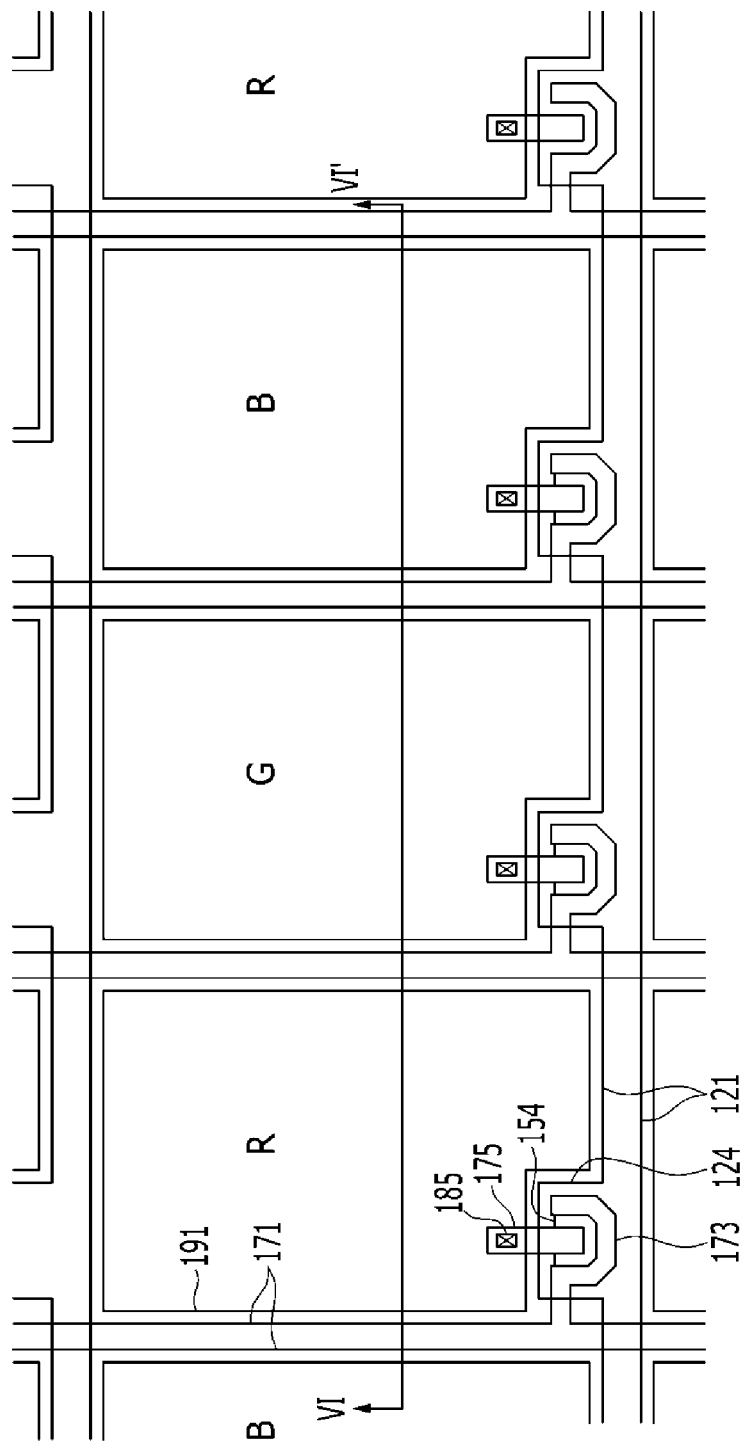
FIG. 5 is a top plan view of a liquid crystal display according to an embodiment of the present invention.
Figure 6:
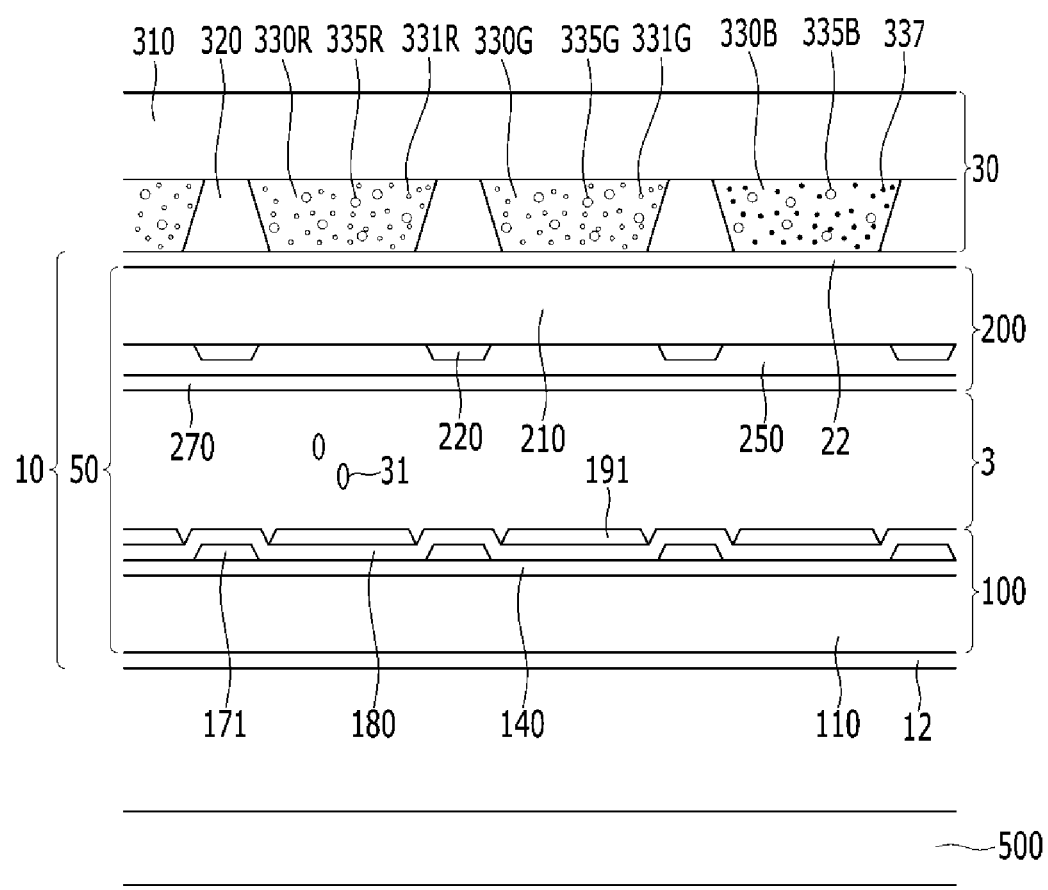
FIG. 6 is a cross-sectional view taken along line VI-VI' of FIG. 5.

Next, the display device according to an embodiment of the present invention will be described with reference to FIG. 4 to FIG. 6. FIG. 4 is a schematic cross-sectional view of a display device according to an embodiment of the present invention, FIG. 5 is a top plan view of a liquid crystal display according to an embodiment of the present invention, and FIG. 6 is a cross-sectional view taken along line VI-VI' of FIG. 5.

First, referring to FIG. 4, the display device according to an embodiment of the present invention will be schematically described. The display device includes a color conversion panel 30, a display panel 10 that meets the color conversion panel 30, and a light assembly or backlight device 500. The color conversion panel 30 according to an embodiment of the present invention may be the color conversion panel described with reference to FIG. 1 to FIG. 3, such that the description thereof is omitted. In embodiments, the conversion panel 30 may be arranged with respect to the display panel 10 such that each of the color conversion layer 330R and 330G and the transmission layer 330B is aligned with and corresponds to one of the pixels of the display panel 10.

Next, the display panel 10 may include a liquid crystal panel forming a vertical electric field, but it is not limited thereto, and it may be a display panel such as a liquid crystal panel forming a horizontal electric field, a plasma display panel (PDP), an organic light emitting diode display (OLED), a surface conduction electron-emitter display (SED), a field emission display (FED), a vacuum fluorescent display (VFD), or an e-paper. Hereafter, the display panel 10 forming the vertical electric field will be described in detail as an example.

Next, the light assembly 500 may include a light source disposed under the display panel 10 and generating light, and a light guide receiving the light and guiding the received light in the direction of the display panel 10 and the color conversion panel 30. When the display panel 10 is the self-emissive display device, the light assembly 500 may be omitted.

As an example of the present invention, the light assembly 500 may include at least one light emitting diode, and may be a blue light emitting diode. The light source according to the present invention may be an edge-type light assembly disposed on at least one side of the light guide plate, or may be a direct-type where the light source of the light assembly 500 is disposed in a direct lower portion of the light guide plate, however it is not limited thereto.

Next, the display panel 10 according to an embodiment of the present invention will be described in detail with reference to FIG. 5 and FIG. 6.

The display panel 10 may include a liquid crystal panel 50 representing the image and polarizers 12 and 22 on respective surfaces of the liquid crystal panel 50. The first polarizer 12 and the second polarizer 22 for polarization of the light incident from the light assembly 500 are disposed at respective surfaces of the liquid crystal panel 50.

The polarizers 12 and 22 may be at least one of a coating polarizer and a wire grid polarizer. These polarizers 12 and 22 may be disposed at one surface of the display panel 100 and 200 by various methods, such as a film method, a coating method, an adhering method, and the like. However, this description is one example and it is not limited thereto.

The liquid crystal panel 50 includes a lower panel 100 including a thin film transistor to display the image, an upper panel 200 including a second insulation substrate 210 facing the lower panel 100, and a liquid crystal layer 3 interposed between the lower panel 100 and the upper panel 200.

In embodiments, the display panel includes a plurality of pixels. To form the plurality of pixels, a plurality of pixel electrodes are disposed on the first substrate 110 included in the lower panel 100 in a matrix shape.

Disposed on the first substrate 110 are a gate line 121 extending in a row direction and including a gate electrode 124, a gate insulating layer 140 disposed on the gate line 121, a semiconductor layer 154 disposed on the gate insulating layer 140, a data line 171 disposed on the semiconductor layer 154, extending in a column direction, and including a source electrode 173, a drain electrode 175, a passivation layer 180 disposed on the data line 171 and the drain electrode 175, and a pixel electrode 191 electrically and physically connected to the drain electrode 175 through a contact hole 185 disposed.

The semiconductor layer 154 disposed on the gate electrode 124 forms a channel layer in the region that is exposed by the source electrode 173 and the drain electrode 175, and the gate electrode 124, the semiconductor layer 154, the source electrode 173, and the drain electrode 175 form one thin film transistor.

The second substrate 210 faces the first substrate 110 to be separated therefrom. A light blocking member 220, a planarization layer 250, and a common electrode 270 are disposed between the second substrate 210 and the liquid crystal layer 3.

Specifically, the light blocking member 220 is disposed between the second substrate 210 and the first substrate 110. The planarization layer 250 providing the flat surface may be disposed between the light blocking member 220 and the first substrate 110, and the common electrode 270 is disposed between the planarization layer 250 and the first substrate 110. According to an embodiment, the planarization layer 250 may be omitted.

The common electrode 270 receiving a common voltage forms an electric field with the pixel electrode 191 and arranges liquid crystal molecules 31 disposed in the liquid crystal layer 3.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules, transmittance of light received from a light assembly 500 may be controlled to display an image.

Figure 7:
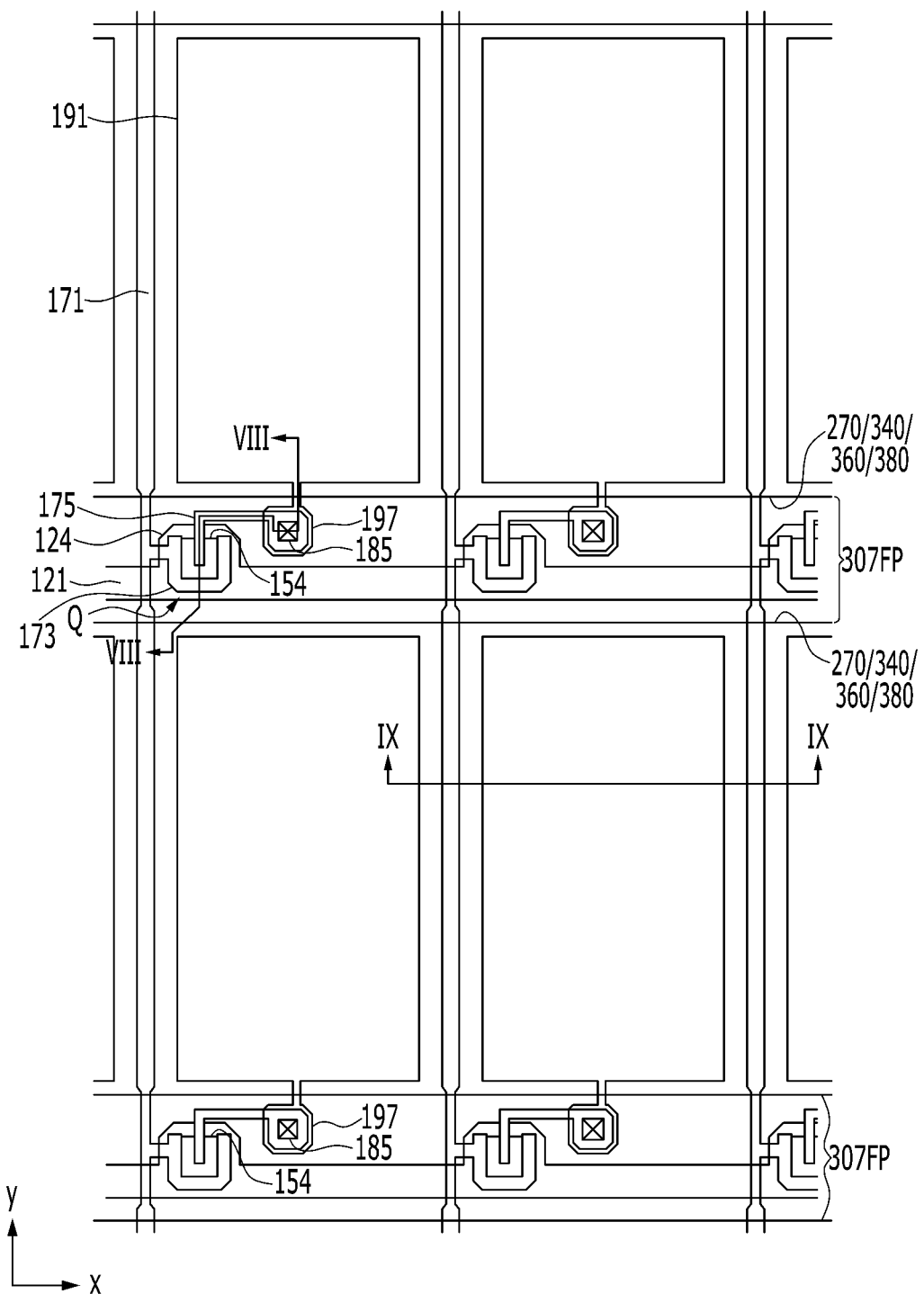
FIG. 7 is a top plan view of one pixel of a liquid crystal display according to an embodiment of the present invention.
Figure 8:
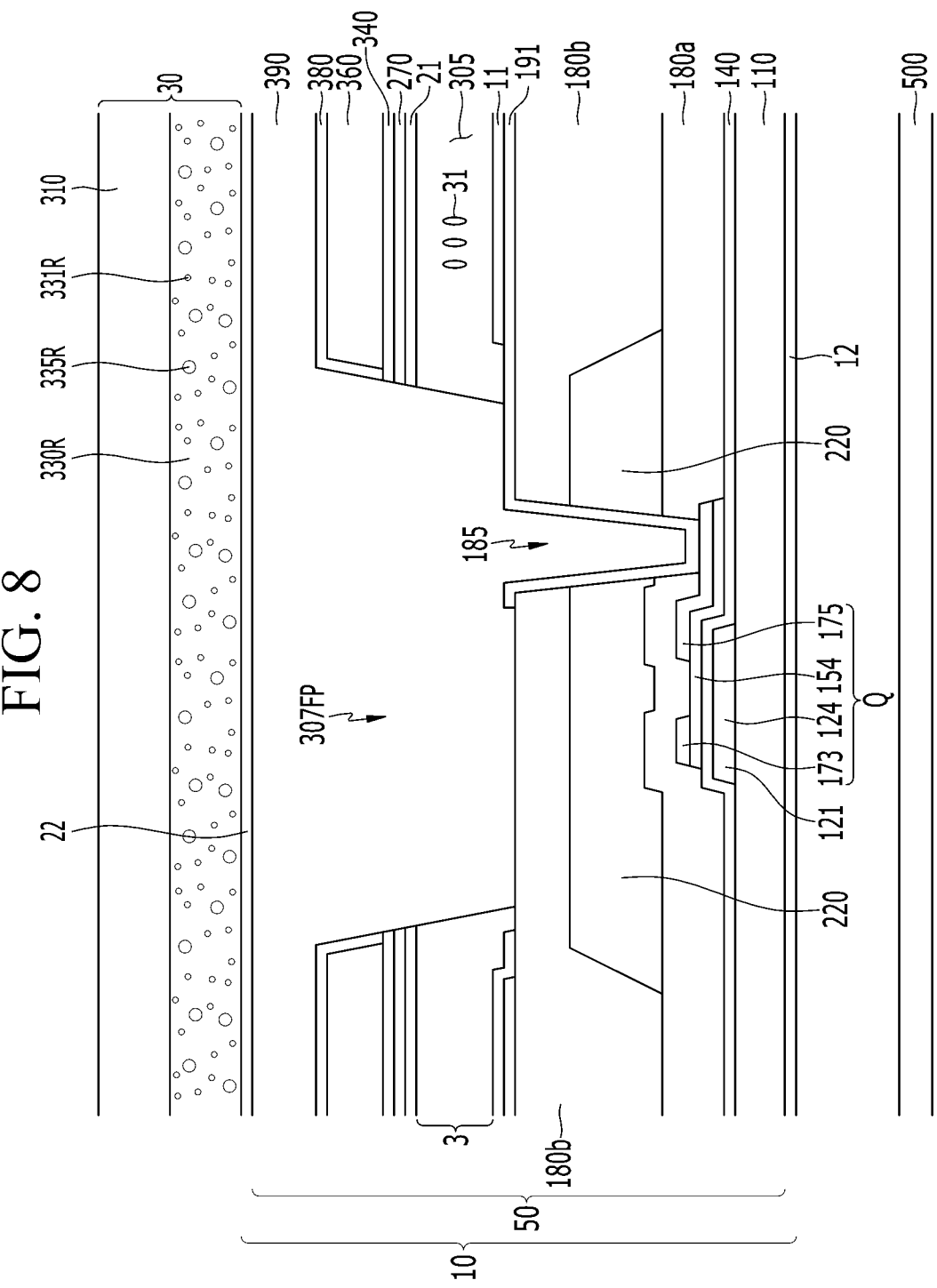
FIG. 8 is a cross-sectional view taken along line VIII-VIII of FIG. 7.
Figure 9:
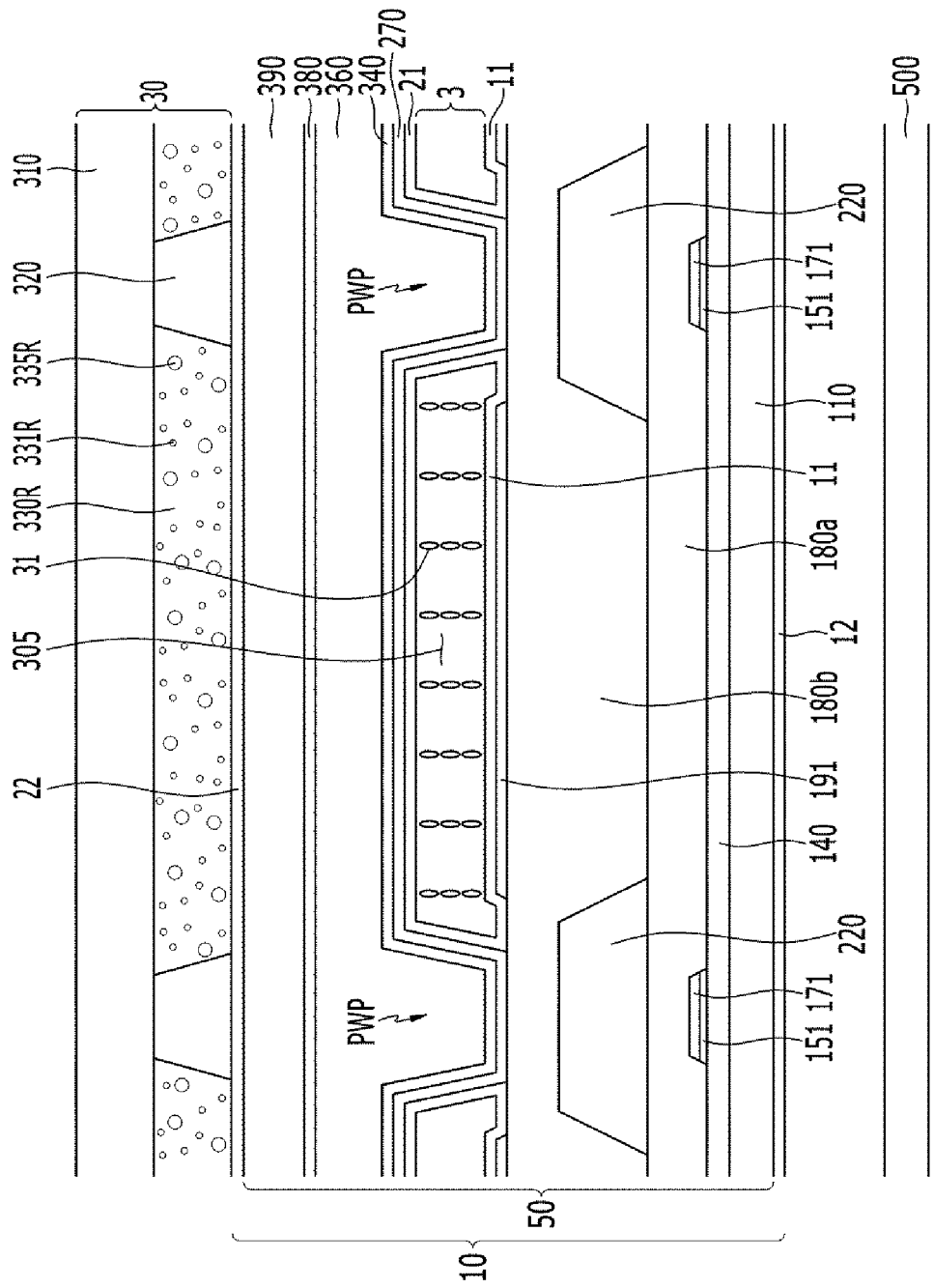
FIG. 9 is a cross-sectional view taken along line IX-IX.

Next, the display device according to an embodiment of the present invention will be described with reference to FIG. 7 to FIG. 9. FIG. 7 is a top plan view of one pixel of a liquid crystal display according to an embodiment of the present invention, FIG. 8 is a cross-sectional view taken along line VIII-VIII of FIG. 7, and FIG. 9 is a cross-sectional view taken along line IX-IX.

The display device according to an embodiment of the present invention includes the color conversion panel 30, the display panel 10, and the light assembly 500. The display panel 10 may be disposed on the light assembly 500, and the color conversion panel 30 may be disposed on the display panel 10.

The color conversion panel 30 and the light assembly 500 included in the display device according to an embodiment of the present invention are the same as in the above-described embodiment, such that the description thereof is omitted.

Next, the display panel 10 may include a liquid crystal panel 50 displaying an image and polarizers 12 and 22 disposed on respective surfaces of the liquid crystal panel 50. A first polarizer 12 and a second polarizer 22 for polarization of the light incident from the light assembly 500 are disposed at respective surfaces of the liquid crystal panel 50.

FIG. 7 shows a 2×2 pixel part as a center part of the plurality of pixels respectively corresponding to a plurality of microcavities 305, and these pixels may be repeated vertically and horizontally in the display device according to an embodiment of the present invention.

Referring to FIG. 7 to FIG. 9, in the liquid crystal panel 50 according to an embodiment of the present invention, a gate line 121 on a substrate 110 includes a gate electrode 124.

A gate insulating layer 140 is disposed on the gate line 121. On the gate insulating layer 140, a semiconductor layer 151 is disposed under a data line 171 and a semiconductor layer 154 is disposed under source/drain electrodes 173 and 175 and in a channel part of a thin film transistor Q.

Data conductors 171, 173, and 175, including the source electrode 173, the data line 171 connected to the source electrode 173, and the drain electrode 175, are formed on the semiconductor layers 151 and 154 and the gate insulating layer 140.

The gate electrode 124, the source electrode 173, and the drain electrode 175 form the thin film transistor Q along the semiconductor layer 154, and the channel of the thin film transistor Q is formed in the semiconductor layer 154 between the source electrode 173 and the drain electrode 175.

A first passivation layer 180a may be disposed on the data conductors 171, 173, and 175 and the exposed part of the semiconductor layer 154. The first passivation layer 180a may include an inorganic insulator such as silicon nitride (SiNx) and silicon oxide (SiOx) or an organic insulator.

A light blocking member 220 and a second passivation layer 180b are disposed on the first passivation layer 180a.

The light blocking member 220 is formed in a lattice structure having openings corresponding to an area displaying the image, and made of a material through which light does not pass.

The second passivation layer 180b may include an inorganic insulator such as silicon nitride (SiNx) and silicon oxide (SiOx) or an organic insulator.

The first and second passivation layers 180a and 180b and the light blocking member 220 have a contact hole 185 exposing the drain electrode 175.

The pixel electrode 191 is disposed on the second passivation layer 180b. The pixel electrode 191 may be made of a transparent conductive material such as ITO or IZO.

The overall shape of the pixel electrode 191 is planar shape.

The pixel electrode 191 includes a protrusion 197 which is physically and electrically connected to the drain electrode 175 on the protrusion 197 through the contact hole 185, thereby receiving the data voltage from the drain electrode 175.

The thin film transistor Q and the pixel electrode 191 described above are only described as examples, and the structure of the thin film transistor and design of the pixel electrode are not limited to the structure described in the present embodiment, but may be modified to be applied based on the description according to an embodiment of the present invention.

A lower alignment layer 11 is disposed on the pixel electrode 191, and the lower alignment layer 11 may be a vertical alignment layer. The lower alignment layer 11 may include at least one of the materials generally used as a liquid crystal alignment layer, such as polyamic acid, polysiloxane, polyimide, or the like.

An upper alignment layer 21 is disposed to face the lower alignment layer 11, and the microcavities 305 are disposed between the lower alignment layer 11 and the upper alignment layer 21. Liquid crystal molecules 31 are injected in the microcavities 305 to form the liquid crystal layer 3. A plurality of microcavities 305 may be disposed along the column direction of the pixel electrode 191, i.e., the vertical direction. In the present embodiment, an alignment material forming the alignment layers 11 and 21 and the liquid crystal molecule 31 including the liquid crystal molecules may be injected to the microcavities 305 by using a capillary force. In the present embodiment, the lower alignment layer 11 and the upper alignment layer 21 are only divided depending on the position, as shown in FIG. 9, and may be connected to each other. The lower alignment layer 11 and the upper alignment layer 21 may be simultaneously formed.

The lower alignment layer 11 and the upper alignment layer 21 described above are only described as examples, and the lower and the upper alignment layer material are not limited to the structure described in the present embodiment, but may be modified to be applied based on the description according to an embodiment of the present invention.

The microcavities 305 are divided in the vertical direction by a plurality of liquid crystal inlets 307FP disposed at the portion overlapping the gate line 121 to form the plurality of microcavities 305, and the plurality of microcavities 305 may be disposed along the column direction of the pixel electrode 191, i.e., the vertical direction. Also, the microcavities 305 are divided by a partition PWP in the X-axis direction to form a plurality of microcavities 305, and the plurality of microcavities 305 may be formed along the X-axis direction of the pixel electrode 191. The plurality of the microcavities 305 may correspond to one pixel area, or two or more, and the pixel area may correspond to a region displaying the image.

The common electrode 270 and a lower insulating layer 340 are disposed on the upper alignment layer 21. The common electrode 270 receives the common voltage and generates an electric field together with the pixel electrode 191, to which the data voltage is applied, to determine a direction in which the liquid crystal molecules 31 disposed at the microcavities 305 between the two electrodes are inclined The common electrode 270 forms the capacitor along with the pixel electrode 191 such that the applied voltage is maintained after the thin film transistor is turned-off. The lower insulating layer 350 may be formed of silicon nitride (SiNx) or silicon oxide (SiOx).

In the present embodiment, the common electrode 270 is disposed on the microcavities 305, however the common electrode 270 may be disposed under the microcavities 305 as another embodiment to realize the liquid crystal driving according to a coplanar electrode (CE) mode.

A roof layer 360 is disposed on the lower insulating layer 340. The roof layer 360 serves as a support so that the microcavity 305, which is a space between the pixel electrode 191 and the common electrode 270, is formed. The roof layer 360 may include a photoresist, or other organic materials.

The upper insulating layer 380 is provided on the roof layer 360. The upper insulating layer 380 may come into contact with an upper surface of the roof layer 360.

In the present embodiment, a partition PWP is disposed between the microcavities 305 adjacent in the horizontal direction. The partition PWP may be formed along the Y-axis direction as the direction in which the data line 171 extends and may be covered by the roof layer 360. The partition PWP is filled with the common electrode 270, the lower insulating layer 340, the roof layer 360, and the upper insulating layer 380 and the microcavities 305 may be divided or defined as this structure forms a partition wall.

The upper insulating layer 380 may cover the side wall of the roof layer 360, as a variation of the embodiment, and the sidewalls of the lower insulating layer 340, the roof layer 360, and the upper insulating layer 380 may be formed to be substantially and equally aligned.

A capping layer 390 is disposed on the upper insulating layer 380. The capping layer 390 includes an organic material or inorganic material. In the present embodiment, the capping layer 390 may be formed in the liquid crystal inlet 307FP as well as on the upper insulating layer 380. In this case, the capping layer 390 may cover the liquid crystal inlet 307FP.

The display device according to an embodiment of the present invention has an improved light emission ratio and color reproducibility and reduces the reflection degree, thereby providing the display device with excellent display quality, and one sheet substrate is used, thereby simplifying the manufacturing process and the structure.

Figure 10:
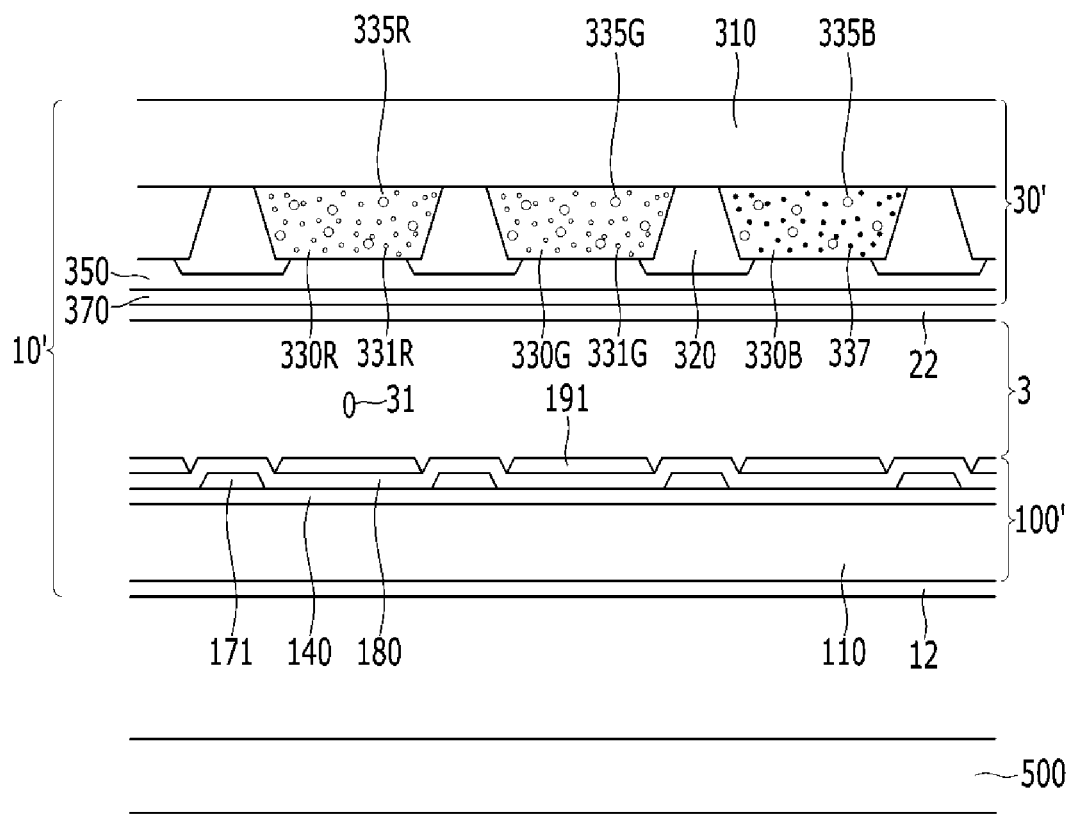
FIG. 10 is a cross-sectional view of a liquid crystal display according to an embodiment of the present invention.

Next, the display device according to an embodiment of the present invention will be described with reference to FIG. 10. FIG. 10 is a cross-sectional view of a display device according to an embodiment of the present invention. The description of the same constituent elements as described above is omitted.

The display device according to the embodiment of the present invention shown in FIG. 10 includes the display panel 10' and the light assembly 500. The display panel 10' may be disposed on the light assembly 500, though it is not limited thereto, and the up/down position may be changed depending on the embodiment of the present invention.

The display panel 10' according to an embodiment of the present invention includes a thin film transistor array panel 100', a color conversion display panel 30' facing the thin film transistor array panel 100' to be separated, and the liquid crystal layer 3 disposed between the thin film transistor array panel 100' and the color conversion display panel 30' and including the liquid crystal molecules. In the display panel 10' according to an embodiment of the present invention, unlike in the above-described embodiment, the color conversion panel 30' forms part of the display panel 10'.

The display panel 10' may further include the first polarizer 12 disposed at one surface of the thin film transistor array panel 100' and the second polarizer 22 disposed at one surface of the color conversion panel 30'.

The thin film transistor array panel 100' according to the present embodiment is the same as the lower panel 100 of FIG. 5 and FIG. 6 and the color conversion panel 30' is similar to the color conversion panel 30 of FIG. 1 such that it will be described with reference to FIG. 1, FIG. 5, and FIG. 6, as well as FIG. 10.

First, the plurality of pixel electrodes are disposed in a matrix shape on the first substrate 110 included in the thin film transistor array panel 100'.

Disposed on the first substrate 110 are the gate line 121 extending in the row direction and including the gate electrode 124, the gate insulating layer 140 disposed on the gate line 121, the semiconductor layer 154 disposed on the gate insulating layer 140, the data line 171 disposed on the semiconductor layer 154, extending in a column direction, and including the source electrode 173, the drain electrode 175, the passivation layer 180 disposed on the data line 171 and the drain electrode 175, and the pixel electrode 191 electrically and physically connected to the drain electrode 175 through the contact hole 185 disposed.

The semiconductor layer 154 disposed on the gate electrode 124 forms the channel layer in the region that is exposed by the source electrode 173 and the drain electrode 175, and the gate electrode 124, the semiconductor layer 154, the source electrode 173, and the drain electrode 175 form one thin film transistor.

Next, the color conversion display panel 30' includes a separated substrate 310 that faces the first substrate 110. Next, the color conversion layers 330R and 330G, the transmission layer 330B, and the light blocking member 320 disposed between the substrate 310 and the liquid crystal layer 3 are included. Specifically, the color conversion layers 330R and 330G and the transmission layer 330B disposed between the substrate 310 and the first substrate 110 and the light blocking member 320 are included.

The color conversion layers 330R and 330G may emit the incident light into light of different colors, and, as an example, may be the red color conversion layer 330R and the green color conversion layer 330G. The transmission layer 330B may emit incident light without the separate color conversion, and, as an example, the blue light is incident and then the blue light may be emitted.

The light blocking member 320 includes a plurality of blocking portions, each of which is disposed between immediately neighboring two among the color conversion layers 330R and 330G and the transmission layer 330B, and more specifically, may define the region where the red color conversion layer 330R, the green color conversion layer 330G, and the transmission layer 330B are disposed.

The planarization layer 350 providing the flat surface may be disposed between the color conversion layer 330R and 330G, the transmission layer 330B, and the light blocking member 320 and the first substrate 110, and the common electrode 370 may be disposed between the planarization layer 350 and the first substrate 110. The planarization layer 350 may be omitted depending on an embodiment.

The common electrode 270 receiving a common voltage forms an electric field with the pixel electrode 191 and arranges liquid crystal molecules 31 disposed in the liquid crystal layer 3.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules, transmittance of light received from a light assembly 500 may be controlled to display an image.

The display device according to the described embodiment of the present invention does not include the upper panel 200 shown in FIG. 6 and the color conversion display panel 30' replaces the function and the position of the upper panel. This display device may be provided with a thinner thickness and the cost and the weight may be reduced.

Figure 11:
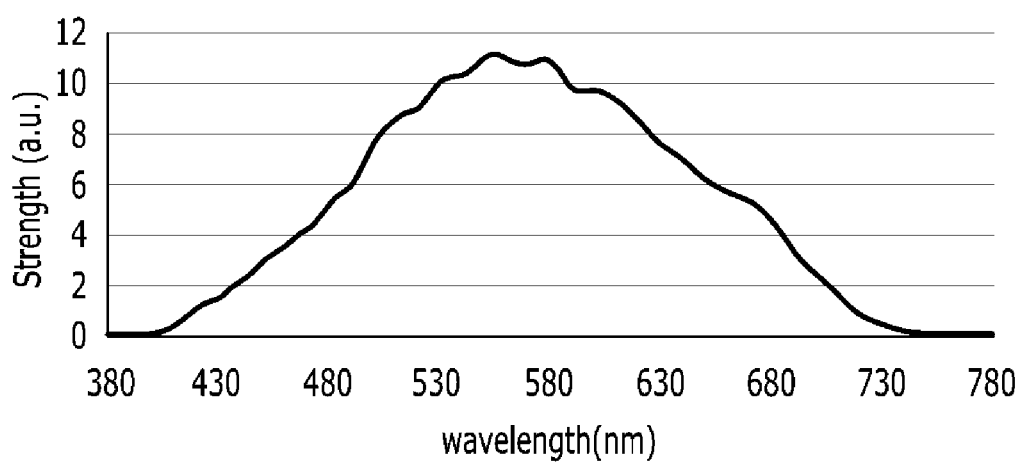
FIG. 11 and FIG. 12 are graphs showing a reflection degree of a color conversion panel according to a comparative example and an embodiment of the present invention.
Figure 12:
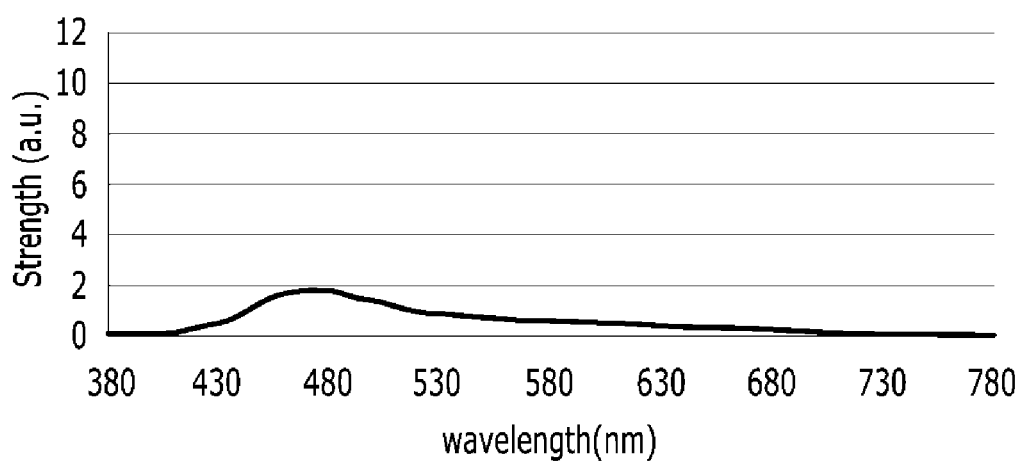

Next, an external light reflection degree of the color conversion panel according to a comparative example and an embodiment of the present invention will be described with reference to FIG. 11 and FIG. 12. FIG. 11 and FIG. 12 are graphs showing a reflection degree of a color conversion panel according to a comparative example and an embodiment of the present invention.

First, FIG. 11 is a reflection spectrum graph of a transmission layer according to the comparative example. The transmission layer according to comparative example does not include a separate pigment and dye.

As a result of the external light spectrum of the transmission layer according to the comparative example, as shown in FIG. 11, strength of a high level has been detected in the wavelength band representing the blue light. In embodiments, it may be confirmed that a high level reflection is generated in the transmission layer in which the pigment and dye is not included.

On the other hand, as a result of the external light spectrum of the transmission layer including at least one of the pigment and the dye according to an embodiment of the present invention, it may be confirmed that the reflection degree is small compared to the entire wavelength region as shown in FIG. 12.

Next, Table 1 will be described in detail. According to Table 1, as the concentration of the blue pigment included in the transmission layer is increased, it may be confirmed that the reflectance of the transmission layer due to the external light is decreased. When the concentration of the blue pigment is 15 wt %, the reflectance of the transmission layer is decreased by nearly 90%.

TABLE 1

| blue pigment concentration (wt %) | Reflectance |
| --- | --- |
| 0 | 100 |
| 15 | 11 |
| 20 | 9 |
| 30 | 5 |

The reflectance generated in the transmission layer among the color conversion layers accounted for more than half of the reflectance generated in the entire color conversion layer. This is the reason that the transmission layer includes the large amount of scattering members compared with the red and green color conversion layers and increases the reflectance of the transmission layer while the scattering members scatter the light. However, as described above, the transmission layer including the pigment of about 15 wt % decreases the reflectance by nearly 90%, thereby the entire color conversion layer shows that reflectance is decreased by about 50%.

In summary, the transmission layer including at least one of the pigment and the dye according to an embodiment of the present invention absorbs the red light and the green light among the external light indecent to the color conversion panel and reduces the reflection phenomenon in which the transmission layer is visible in white due to the reflect light. According to the reduction of the reflectance, the contrast ratio of the color conversion panel and the display device may be increased and the display quality may be improved.

While embodiments of this invention have been described in connection with what is presently considered to be practical, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a display panel; and
   a color conversion panel over the display panel, the color conversion panel comprising:
      a substrate overlapping the display panel, and
      a red color conversion layer comprising a first amount of scattering members, a green color conversion layer comprising a second amount of scattering members, and a transmission layer comprising a third amount of scattering members,
wherein the red color conversion layer, the green color conversion layer, and the transmission layer are located between the substrate and the display panel,
wherein the first amount of scattering members and the second amount of scattering members are smaller than the third amount of scattering members, and
wherein the transmission layer comprises at least one of a pigment and a dye.

2. The display device of claim 1, wherein the red color conversion layer and the green color conversion layer do not comprise the pigment and the dye.

3. The display device of claim 1, wherein a content of the scattering members included in the transmission layer is different from that of each or one of the red color conversion layer and the green color conversion layer.

4. The display device of claim 1, wherein the red color conversion layer and the green color conversion layer comprise at least one of a phosphor and a quantum dot.

5. The display device of claim 4, wherein the transmission layer does not comprise the phosphor and the quantum dot.

6. The display device of claim 1, wherein the pigment is a blue pigment, and the dye is a blue dye.

7. The display device of claim 1, further comprising a light blocking member comprising light blocking portions, each of the light blocking portions being located between immediately neighboring two among the red color conversion layer, the green color conversion layer, and the transmission layer.

* * * * *